(12) United States Patent
Subramanian et al.

(10) Patent No.: US 8,643,446 B2
(45) Date of Patent: Feb. 4, 2014

(54) ELECTRO-MAGNETIC INTERFERENCE REDUCTION USING OPPOSING FIELD TRANSMITTER

(75) Inventors: Harihara Subramanian, Bangalore (IN); Gautam K. Singh, Bangalore (IN)

(73) Assignee: Semiconductor Components Industries, LLC, Phoenix, AZ (US)

( * ) Notice: Subject to any disclaimer, the term of this patent is extended or adjusted under 35 U.S.C. 154(b) by 438 days.

(21) Appl. No.: 13/020,443

(22) Filed: Feb. 3, 2011

(65) Prior Publication Data

US 2012/0098591 A1    Apr. 26, 2012

(30) Foreign Application Priority Data

Oct. 26, 2010    (IN) .......................... 2551/DEL/2010

(51) Int. Cl.
*H04B 1/10*    (2006.01)
(52) U.S. Cl.
USPC ........................................... 333/12; 455/296
(58) Field of Classification Search
USPC ................. 333/12; 455/296; 348/E5.077
See application file for complete search history.

(56) References Cited

U.S. PATENT DOCUMENTS

| | | | |
|---|---|---|---|
| 5,606,734 A * | 2/1997 | Bahu | 455/303 |
| 6,013,957 A * | 1/2000 | Puzo et al. | 307/91 |
| 6,510,526 B1 | 1/2003 | Schoenborn | |
| 7,099,662 B2 * | 8/2006 | Fuenfgeld et al. | 455/423 |

OTHER PUBLICATIONS

Kyle Swartz, et al., "High Frequency PCB Layout", Bosch, Invented for Life, Mar. 24, 2008, http://www.egr.msu.edu/classes/ece480/goodman/spring08/group05/docs/High_Freq_PCBlayout.pdf (17 pages).

* cited by examiner

*Primary Examiner* — Robert Pascal
*Assistant Examiner* — Kimberly Glenn
(74) *Attorney, Agent, or Firm* — Kevin B. Jackson

(57) ABSTRACT

An electronic system that partially or perhaps even fully mitigates the effects of EMI by having a dedicated antenna circuit for carrying an antenna signal that is not used for signal processing in the functional circuit, but is instead used to emit electromagnetic radiation that at least partially offsets EMI emitted by the operation signal of a functional circuit. An antenna signal generation circuit generates the antenna signal and asserts the antenna signal on the antenna circuit. The ante a signal has the characteristic such that when the antenna signal is applied to the antenna circuit, the resultant emitted electromagnetic radiation at least partially offsets electro-magnetic interference emitted by the functional circuit.

21 Claims, 4 Drawing Sheets

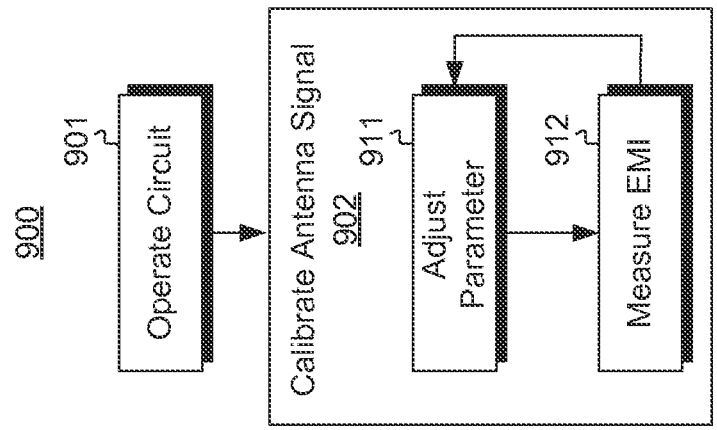
*Figure 9*
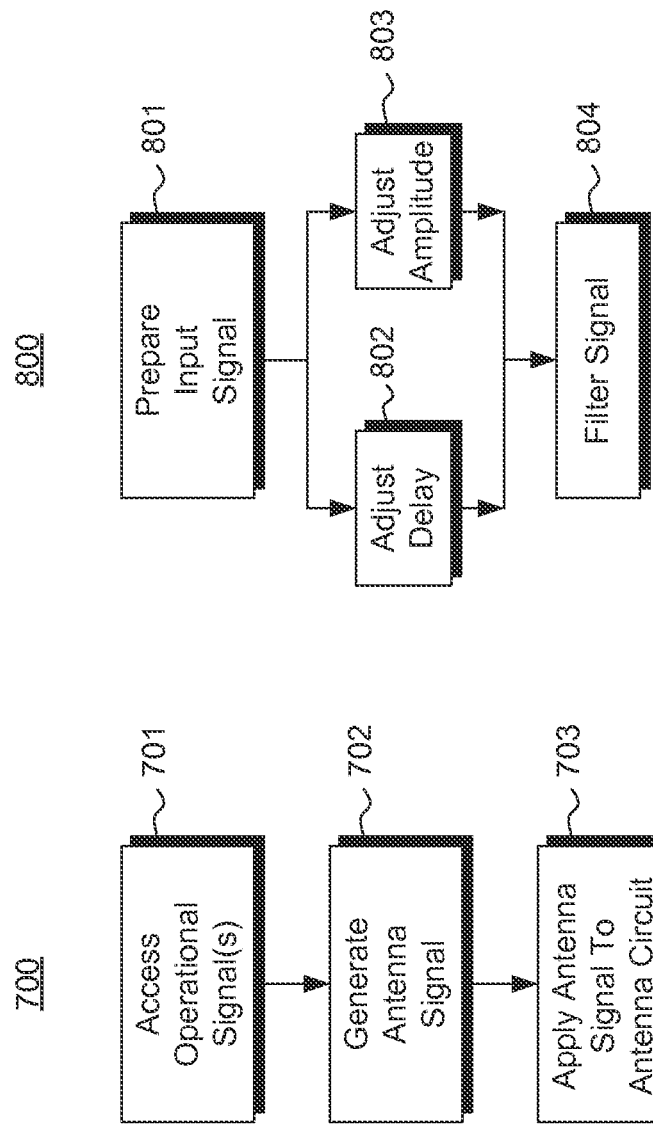
*Figure 8*
*Figure 7*

ELECTRO-MAGNETIC INTERFERENCE REDUCTION USING OPPOSING FIELD TRANSMITTER

CROSS REFERENCE TO RELATED APPLICATIONS

This application claims priority to Indian Patent Application No. 2551/DEL/2010 filed on Oct. 26, 2010, which is expressly incorporated by reference herein.

BACKGROUND

Electronic circuitry has contributed enormously to the advancement of civilization. Designers of electronic circuitry take various constraints into account when conceiving such circuits. One of these constraints is the electromagnetic compatibility (or EMC) of the circuit they are designing. While operating, the circuit should not radiate excessive electromagnetic energy in order not to interfere with the proper operation of other surrounding circuits. Such interference is often termed Electro-Magnetic Interference (EMI).

EMI will radiate to some extent every time a time-dependent voltage or current signal is present on chip. If the EMI is excessive, the functionality of the circuit or its surrounding circuitry may be adversely affected. Also, there are sometimes strict you limits to the amount of EMI that may be emitted as a function of frequency. For instance, in the United States, the Federal Communication Commission (FCC) regulates the usage of certain frequencies of electromagnetic energy.

There are many conventional mechanisms for reducing the amount of EMI emitted by a circuit including the use of passive filters, spread spectrum generation, shielding, and differential signaling.

Passive filtering removes higher frequency harmonics from a signal, thereby degrading signal integrity. Passive components cannot be used to reduce the EMI in the fundamental frequency of a signal unless they reduce the signal amplitude, which is also a trade-off between signal quality and EMI reduction. Spread spectrum generation is an effective solution but there are instances where the deviation in frequency cannot exceed a certain limit and hence spread spectrum generation is typically a trade-off between EMI reduction and functionality of the system. In shielding, the signal is shielded using a metal and dielectric case or layers to contain the electromagnetic waves within a certain physical zone.

Differential signaling and twisted pairs use the concept of electromagnetic field cancelling. However the primary use of the technologies is to preserve signal integrity at higher speeds rather than EMI reduction. The technologies cannot be used to reduce EMI in an existing single-ended system. Furthermore, in differential systems, there is usually still some common node noise that leads to EMI emissions.

BRIEF SUMMARY

At least one embodiment described herein relates to an electronic system that includes or is proximate a functional circuit that carries an operational signal. An unwanted side effect of the operational signal is that the functional circuit can act as a transmission antenna causing unwanted emissions of electromagnetic interference (EMI). However, the effect of such EMI is at least partially mitigated by having a dedicated transmitter antenna circuit for carrying an antenna signal that is not used for signal processing, but is used to emit electromagnetic radiation that at least partially offset EMI. An antenna signal generation circuit is coupled to the antenna circuit and generates the antenna signal. The antenna signal has the characteristic such that when the antenna signal is applied to the antenna circuit, the resultant emitted electromagnetic radiation at least partially offsets electromagnetic interference emitted by the operational signal from the functional circuit. In some embodiments, the generation of the antenna signal is performed without reducing the signal quality of the operational signal.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 7 illustrates a flowchart of a method for operating an electrical circuit having an antenna circuit for reducing EMI emissions;

FIG. 8 illustrates a flowchart of a method for generating the antenna signal that may be used in the method of FIG. 7; and FIG. 9 illustrates a flowchart of a method for calibrating a circuit having an antenna signal for reducing EMI emissions.

DETAILED DESCRIPTION

In accordance with embodiments described herein, an electronic circuit includes or is proximate a functional circuit that carries an operational signal that emits electromagnetic interference (EMI). However, the effect of such EMI is at least partially mitigated by having a dedicated transmission antenna circuit for carrying an antenna signal that is not used for signal processing, but is used to emit offsetting electromagnetic radiation. The antenna signal has the characteristic such that when the antenna signal is applied to the antenna circuit, the resultant emitted electromagnetic radiation at least partially offsets electromagnetic radiation emitted by the operational signal from the functional circuit.

Figure 1:
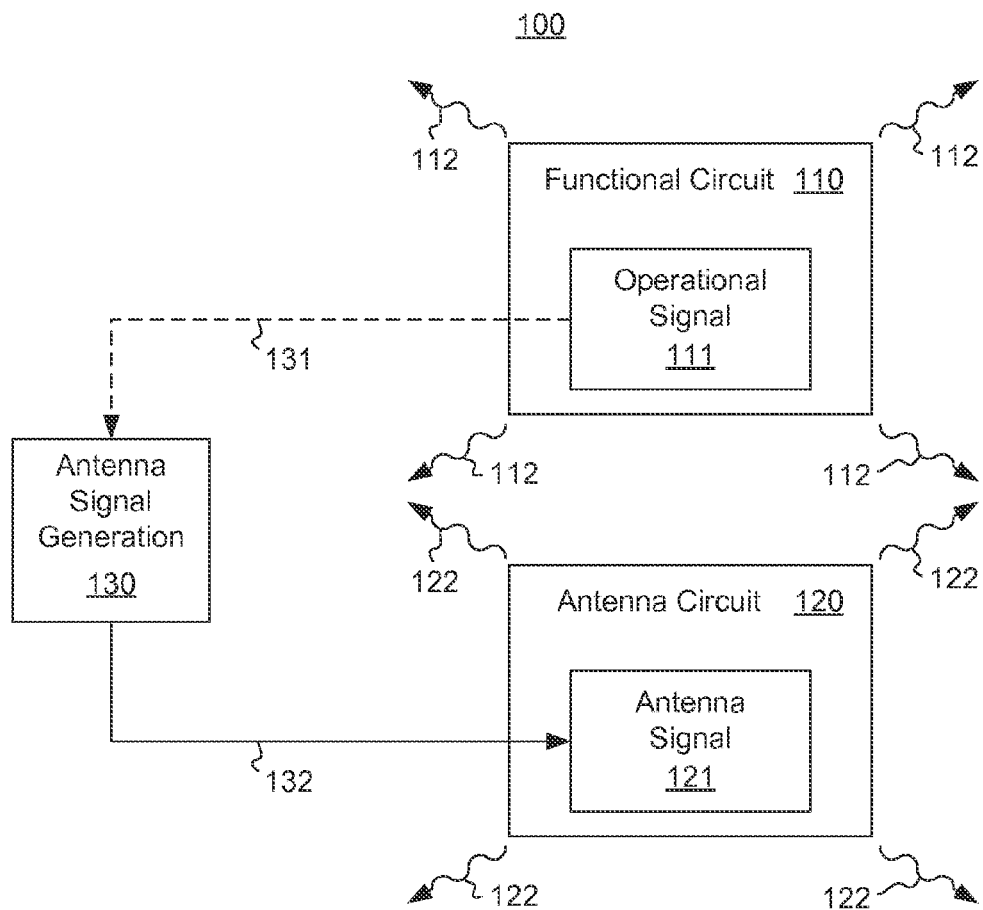
FIG. 1 illustrates an electrical circuit that includes a functional circuit having one or more operational signals that emit electromagnetic interference (EMI) and an antenna circuit having an antenna signal that emits opposing electromagnetic radiation to thereby reduce the amount of EMI emitted by the electrical circuit as a whole.

FIG. 1 abstractly illustrates an electrical system 100 that includes a functional circuit 110 that carries one or more electrical signals 111. The functional circuit 110 may be any circuit regardless of its function as all electrical circuits include one or more operational signals. When a time-dependent current moves through an electrical conductor, the conductor emits corresponding electromagnetic radiation. In many cases, such emitted electromagnetic radiation is not desirable in which case the radiation is referred to as electromagnetic interference (EMI). Accordingly, the functional circuit 110 emits electromagnetic interference 112.

There are often strict limits to the amount of permissible EMI since EMI can interfere with the operation of surrounding circuitry. Such limits may be imposed by customers either expressly or implicitly by requiring functionality be unimpeded by excessive EMI emissions. Alternatively or in addition, limits on EMI emissions may be imposed by governmental entities.

In order to reduce EMI emissions, the electrical system 100 also includes an antenna circuit 120 for carrying an antenna signal 121. The antenna circuit 120 acts as an antenna and is present for the purpose of emitting electromagnetic radiation 122. For at least some frequencies, the electromagnetic radiation 122 at least partially offsets electromagnetic interference 112 emitted by an operational signal(s) 111 of the functional circuit 110.

The electrical system 100 also includes an antenna signal generation circuit 130 in proximity (and perhaps coupled in some embodiments) to the functional circuit 110. The electrical system further is coupled to the antenna circuit 120 and generates the antenna signal 121 such that the antenna signal 121 is applied to the antenna circuit 120 as represented by arrow 132. In some embodiment, the antenna signal generation circuit 130 is coupled to the functional circuit 110 so as to access at least one of the one or more operational signals 111 of the functional circuit 110 (as represented by dashed arrow 131). Depending on the frequencies for which EMI can be most harmful, there may be particular signals that are more problematic than others. As an example, square wave clock signals may often have high frequency components that emit EMI haying problematic frequency characteristics.

The electrical system 100 may be on a single integrated circuit (e.g., on a single semiconductor die), or perhaps distributed across multiple integrated circuits (e.g., across multiple semiconductor dies) perhaps on the same circuit board or within the same packaging. For instance, the functional circuit 110 might be on one integrated circuit, whereas the antenna signal generation circuit 130 and antenna circuit 120 are on a separate integrated circuit, but perhaps being proximate the functional circuit 110.

The mathematics of how an antenna signal may be generated and adapted so as to reduce EMI will now be described, so that the operation of subsequent more concretely described embodiments may be clarified. The functional circuit 110 having the operational signal(s) 111 may be modeled as a first antenna (also referred herein as the "primary antenna") carrying a signal having time-varying current represented herein as $I_1$. Likewise, the antenna circuit 120 having antenna signal 121 may be modeled as a second antenna (also referred to herein as the "compensating ante a") carrying a signal having time-varying current represented herein as $I_2$.

By placing the antenna circuit 120 in close proximity to the functional circuit 110, the combination may be viewed as an antenna array in which the array has a lower radiation pattern as compared to radiation pattern of the primary antenna that models the functional circuit 110.

From the theory behind a simple 2-element antenna array, it can found that the electric and magnetic field vectors are given by the following Equation 1:

$$E_\theta = \eta * H_\Phi = (jk\eta/4\pi r) * \text{Sin } \theta * e^{-jkr} \\ (I_1 dl_1 e^{jka*\sin\theta\cos\Phi} + I_2 dl_2 e^{-jka*\sin\theta\cos\Phi}) \quad (1)$$

In this equation, the primary antenna and the compensating antenna are modeled in the x-plane of Cartesian space, and the symbol "a" represents half the distance between the two antennas (i.e., the distance between the two antennas is 2 times "a"). Furthermore, the symbol "θ" represents the angle between an arbitrary point "P" and the y-z plane, where "P" is assumed to be relatively far from the antennae as compared to the size of the antenna and the separate distance "2a" between the two antennas. The symbol "Φ" represents the angle between the point "P" and the x-y plane in the referenced Cartesian space. The symbol "r" represents the radial distance between the point "P" and the mid-point between the two antennas. The symbol "η" represents the characteristic impedance of the medium of the antenna. The symbol "k" represents the wave number of the radiation. The symbol "j" represents the square root of negative one, which is the imaginary constant used in complex number theory. The symbol "$dl_1$" represents the loop length of the primary antenna, and the symbol "$dl_2$" represents the loop length of the compensating antenna. The symbol "$E_\theta$" represents the electric field vector at point "P". The symbol "$H_\Phi$" represents the magnetic field vector at point "P".

In order to further manipulate Equation 1, let the symbol "β" be used to represented the ratio of the product of the current "$I_2$" and loop length "$dl_2$" of the secondary antenna to the product of the current "$I_2$" and loop length "$dl_1$" of the primary antenna (i.e., $\beta = I_2 dl_2/I_1 dl_1$). Furthermore, let "$I_1$" (the time-varying current of the primary antenna) be represented as a sinusoidal wave having magnitude "$I_0$" and frequency "ω" ($I_1 = I_0 e^{j\omega t}$). Finally, let "$I_2$" (the time-varying current of the compensating antenna) be represented as a sinusoidal wave having magnitude "$I_0$", the same frequency ω as the primary antenna, and phase difference "χ" as compared to the primary antenna (i.e., $I_2 = I_0 e^{j\omega t + \chi}$).

Using the terms explained above, for a given relationship between the signal amplitudes and phase difference, following Equation 2 applies:

$$E_\theta = (jk\eta/4\pi r) * \text{Sin } \theta * e^{-jkr} * e^{-j\chi/2} * I_1 dl_1 * \{(1+\beta)*\cos \\ (ka*\sin\theta\cos\Phi - \chi/2) + j*(1-\beta)*\sin \\ (ka*\sin\theta\cos\Phi - \chi/2)\} \quad (2)$$

Equation 2 may be rewritten as Equation 3 as follows:

$$E_\theta = E_0 * \{(1+\beta)*\cos(ka*\sin\theta\cos\Phi - \chi/2) + j*(1-\beta)*\sin \\ (ka*\sin\theta\cos\Phi - \chi/2)\} \quad (3)$$

Here, the symbol "$E_0$" represents the electric field vector of a single antenna. The power of the resultant wave is given by the following Equation 4:

$$P = 1/2\eta * E_\theta * \overline{E_\theta}, \quad (4)$$

Here, "$\overline{E_\theta}$" is the complex conjugate of "$E_\theta$".

In the θ=π/2 plane, Equation 4 may be derived as follows in Equation 5:

$$P = \{E_0^2/2\eta\} * \{((1+\beta)*\cos(ka*\cos\Phi - \chi/2))^2 + \\ ((1-\beta)*\sin(ka*\cos\Phi - \chi/2))^2\} \quad (5)$$

If β=0, we get the power of the primary antenna. If β=1, we get the reduced power due to the matched array of the primary and the secondary antennas.

As seen from Equation 5, the electro-magnetic power of a simple two-element array can be controlled by changing: 1) β, the ratio of products of amplitude and loop length of the two signals, 2) χ, the phase difference between the two signals in time-domain, and 3) 2a, the spacing between the two antenna.

Equation 4 also permits an extension. If there is a net electro-magnetic field of a certain frequency ω due to many different sources, an opposing electro-magnetic field may be created such that this net field is cancelled. Hence, even for an existing array of signals, another signal can be added and by modifying a combination of the three parameters listed above; a net zero or a reduced electromagnetic field can be produced. If the electronic system already exists, some parameters may already be fixed. For instance, as for β, the equivalent loop lengths of the functional circuit 110 and the antenna circuit 120 may be fixed but could have been taken into consideration in the design of the electrical system 100, before the electrical system was manufactured. Also, perhaps the amplitude of the operational signals is not to be changed. In that case, β may be affected by changing the amplitude of the antenna signal. As for χ, the phase of the antenna signal may be adjusted. As for 2a, if the function circuit 110 and antenna circuit 110 are already fixed, 2a cannot be adjusted after manufacture of the electrical system 100, but could be considered in the design phase of the electrical system 100. Thus, after manufacture of the electrical system, the antenna signal may still be adjusted by changing the amplitude and phase of the antenna signal.

Figure 2:
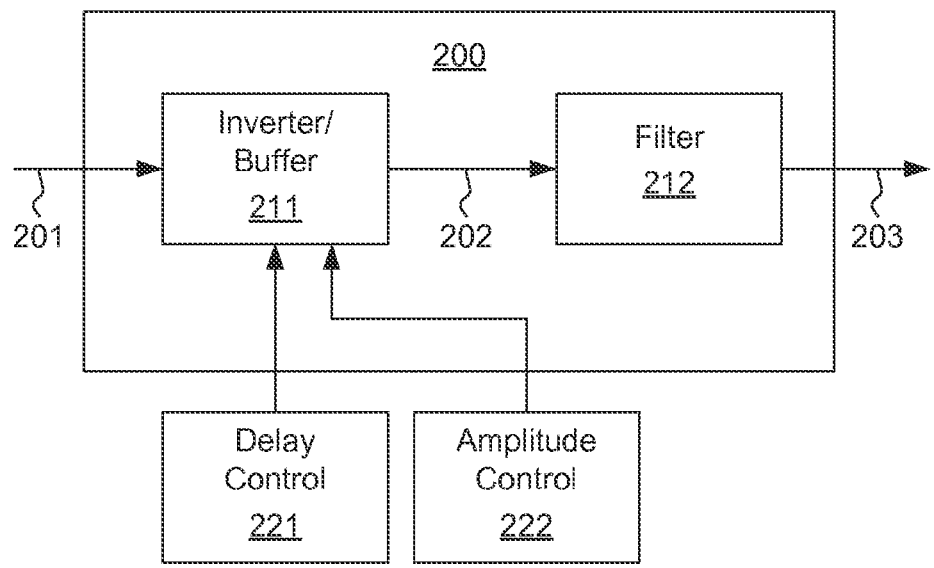
FIG. 2 illustrates an embodiment of the antenna signal generation circuit of FIG. 1 in which the antenna signal is generated using a single-ended signal.
Figure 3:
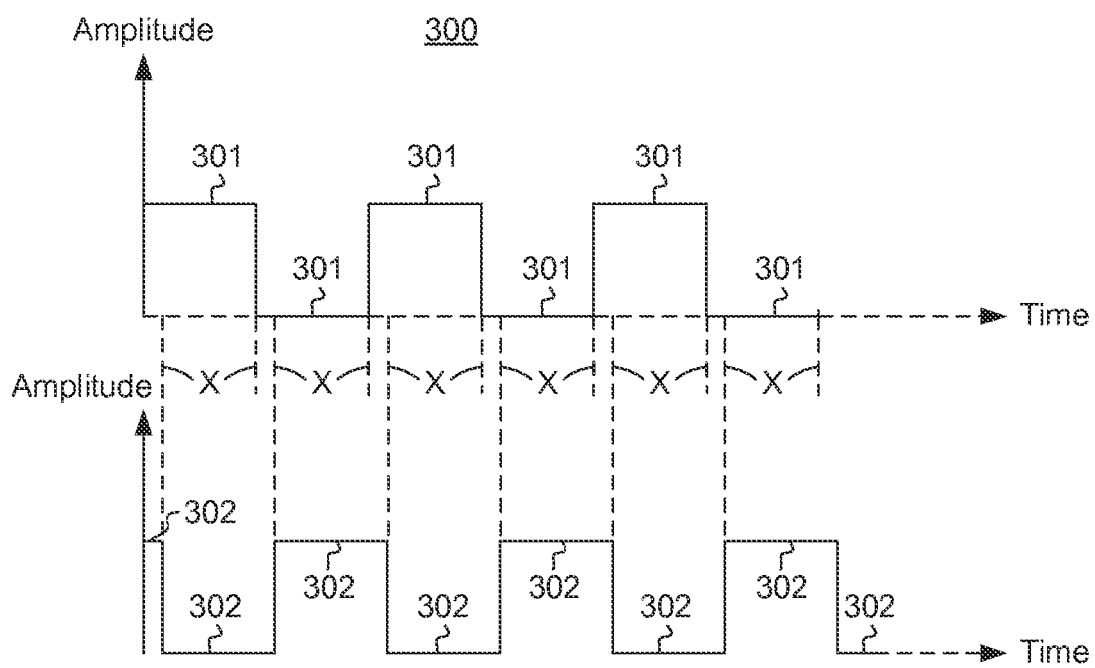
FIG. 3 illustrates a signal timing diagram of example signals that may be used in the environment of FIG. 2.

Now, an example application of the principles of FIG. 1 will be described with respect to a single-ended operation signal in FIGS. 2 and 3. Subsequent to that, an example application of the principles of FIG. 1 will be described with respect to a differential operation signal in FIGS. 4 and 5, in both the single-ended example, and the differential example, the operational signal is used to formulate the antenna signal. However, FIGS. 6 and 7 will then be described, which describe an antenna signal generation circuit that does not use the operational signal to generate the antenna signal, but rather generates the antenna signal to offset a particular harmonic.

First is a discussion of single-ended systems. FIG. 2 illustrates an example antenna signal generation circuit 200 in which the antenna generation circuit 200 uses a single-ended signal of the one or more operational signals of the functional circuit to generate the antenna signal. The antenna signal generation circuit 200 receives an input signal 201. As an example, the input signal might be a single-ended operational signal of the functional circuit. For instance, the single-ended signal might be a clock signal. FIG. 3 illustrates signal timing diagrams for several signals involved in this example operation of the antenna signal generation circuit 200. The signal 301 may be the input signal in the case of a square-wave clock signal.

The input signal 201 is received into a delay mechanism such as an inverter/buffer that introduces a delay into the input signal 202. For example, referring to FIG. 3, the signal 302 might represent a delayed form of the input signal 302. Here, the signal 302 is χ degrees out of phase with the input signal. The delay control 221 provides appropriate adjustments to the phase χ by signaling the inverter/buffer 211 appropriately. This phase may be adjusted at initial manufacture of the electronic system 100 and/or may be adjusted later. The phase χ is thus adjusted to reduce the measured EMI of the operating circuit. The amplitude of the signal 302 might also be adjusted using the adjustable amplitude control 222, which again might be performed once at fabrication, or permits one or more times thereafter to thereby reduce EMI. The amplitude adjustment allows for adjustment of the β factor in Equation 5.

Here, the antenna signal generation circuit 200 is also illustrated as being passed through a filter 212. The filter 212 may be a high pass filter, a low pass filter, a bandpass filter, or the like, and is optional. The filter 212 acts to allow frequencies that are sensitive to EMI to be passed. By passing such frequency components into the antenna signal, the antenna signal is thereby able to counteract the EMI emitted by the operational signals 111 of the functional circuit 110, thereby reducing EMI in the frequency components of interest.

Figure 4:
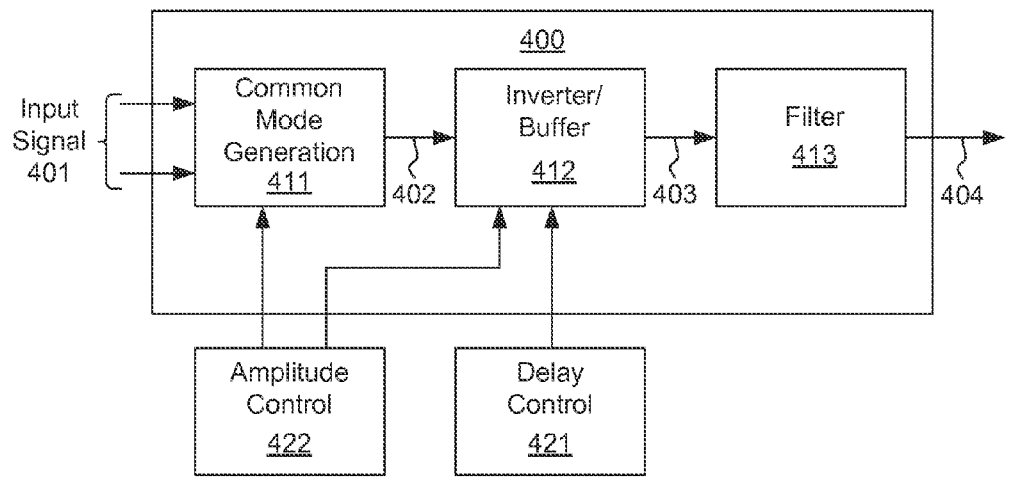
FIG. 4 illustrates an embodiment of the antenna signal generation circuit of FIG. 1 in which the antenna signal is generated using a differential signal.
Figure 5:
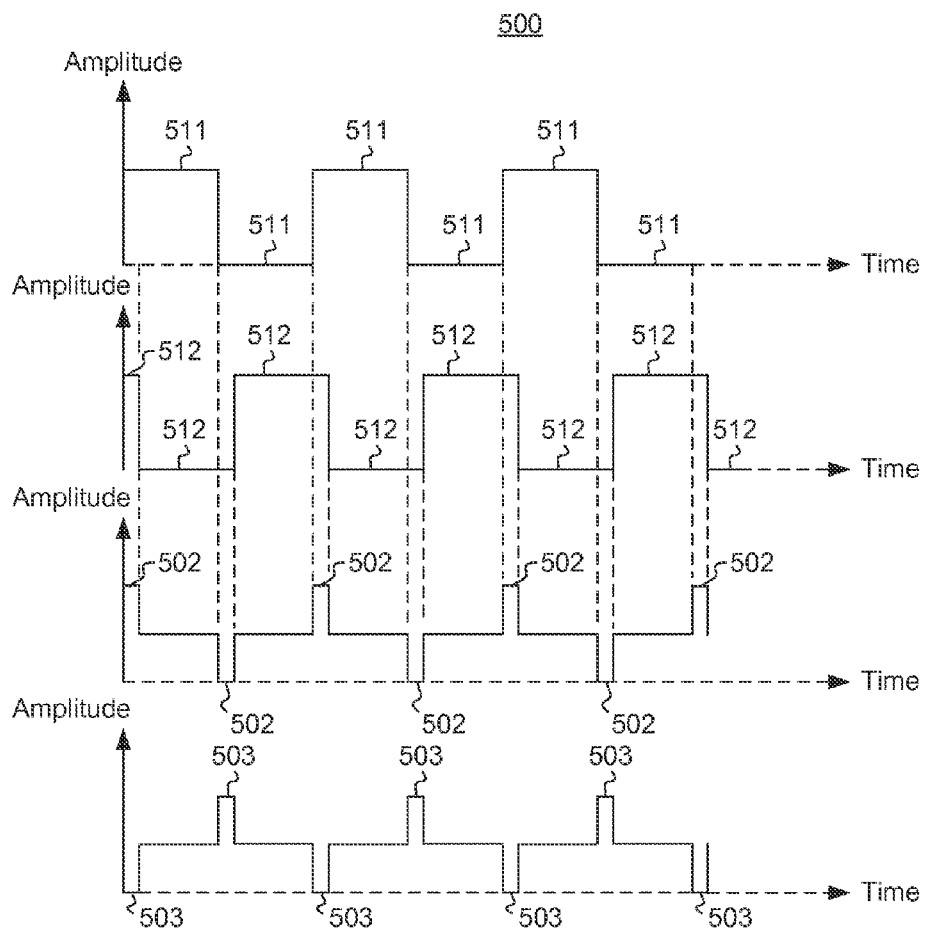
FIG. 5 illustrates a signal timing diagram of example signals that may be used in the environment of FIG. 4.

FIGS. 4 and 5 illustrate the application of the electrical system 100 of FIG. 1 to differential signaling. Many electronic systems have adopted differential signaling as signal standards. In such systems, the opposing signals (as depicted above) provide a basic 2-element antenna array such that $I_1 dl_1 = I_2 dl_2$ and χ=180 degrees in Equation 5. Hence, this array produces a much smaller electromagnetic field than that of a single signal alone. However, even in such systems, EMI results because of the fact that χ is not exactly 180 degrees. Commonly specified as inter-pair skew, this affects the radiation at very high frequencies, where the value of χ turns out to be closer to about 150 degrees. In such systems, differential signaling may not reduce EMI and may even perhaps increase EMI.

FIG. 4 illustrates an example antenna signal generation circuit 400 in which the antenna generation circuit 400 uses a differential signal of the one or more operational signals of the functional circuit to generate the antenna signal. The antenna signal generation circuit 400 for use in differential signaling is similar to the antenna signal generation circuit 200 that is used in single-ended signaling. However, the antenna signal generation circuit 400 has a common mode signal generation circuit 411 that receives a differential input signal 401 and is configured to generate a common mode signal 402 of the differential operation signal.

FIG. 5 illustrates a signal timing diagram 500 for four signals that may be used in the antenna signal generation circuit 400 of FIG. 4. Signals 511 and 512 are the two differential components of the differential input signal 401. Note that they are not exactly 180 degrees out of phase, and thus the common mode signal 502 (which represents an example of the signal 402 of FIG. 4) has pulses. These pulses contribute to EMI in a differential system.

The common mode signal 402 then acts as an input system to the inverter/buffer 412 to which appropriate delay is introduced by the adjustable delay control 421. Signal 503 represents an example of the signal 403 that is output from the inverter/buffer 402. Adjustable amplitude control 422 may be provided to the common mode signal generation circuit 400 of FIG. 4. Once again, such phase and amplitude adjustments may be provided at the time of manufacture or later, and might be provided once or multiple times, and perhaps repeatedly to thereby reduce EMI emissions of the electrical system 100. An optional filter 413 filters the inverted common mode signal 403 to output a filtered output signal that has frequency components that are of interested in reducing EMI. The output signal 404 may be the antenna signal 121 that is asserted on the antenna circuit 120.

Figure 6:
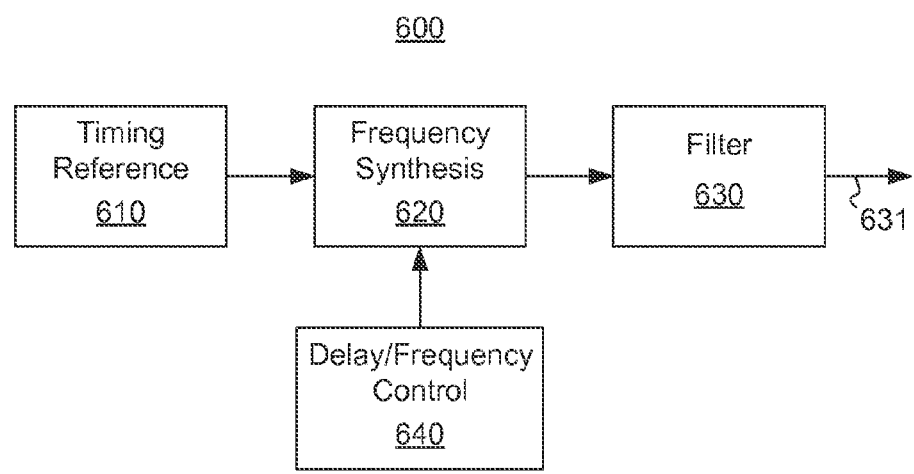
FIG. 6 is an functional block diagram of an example antenna signal generation circuit that may be used in the context of FIG. 1 to reduce EMI of any harmonic.

In any electronic system, the key EMI emissions happen often only at certain selected frequencies. For instance, a clock-generator acts as an electromagnetic transmitter. By generating at this clock frequency or at a harmonic thereof and at a certain controlled-phase such that χ is close to 180 degrees at that frequency, EMI at the clock frequency and/or one or more specific harmonics may be eliminated. For example, if an electronic system emits a 532 megahertz (MHz) harmonic (which is above a Federal Communications Commission compliance limit), the antenna signal can be designed to emit 532 MHz with a controllable phase. The phase can be tuned until the EMI of that harmonic is reduced to be in compliance. This implementation is depicted in FIG. 6, which illustrates an abstract block diagram of an example antenna signal generation circuit 600.

The antenna signal generation circuit 600 uses a timing reference 610, rather than the operational signal(s) of the functional circuit in order to generate an offsetting electromagnetic radiation of the problematic frequency. The timing reference 610 may not generate the signal at the problem frequency, and so the frequency synthesis component 620 is used to generate a signal at the problematic frequency, and with the proper delay, at the direction of the delay/frequency control circuit 640. The signal at the proper frequency is then subjected to filter 630 to allow the antenna signal 631 to be generated with the frequency component that is to be offset in the EMI.

The described electrical system has a number of advances. Firstly, unlike with conventional passive filtering and spread spectrum techniques for EMI reduction, the electrical system 100 may be implemented without significantly impacting signal quality or functionality.

Furthermore, the electrical system 100 may use offsetting electromagnetic radiation in combination with other EMI reduction technologies. For instance, passive filtering, spread spectrum, and shielding techniques may still be used to reduce EMI while still incorporating the principles herein.

Third, even when multiple signals of the same frequency exist in an electronic system, like a fan-out clock buffer, the principles described herein can be used to create a single antenna signal that can reduce or cancel the net of all the other signals or it can used to create an array of signals to reduce or cancel the EMI of each signal.

Fourth, the principles described herein can be extended to both single-ended systems and differential signaling systems that have a non-zero inter pair skew to reduce or cancel the EMI effects of the non-zero inter pair skew.

Fifth, the principles described herein can be used to reduce/cancel a particular frequency or a set of frequencies using a single circuit implementation.

Sixth, the principles described herein can be used to reduce EMI in periodic as well as a-periodic signals.

FIGS. 7 through 9 illustrate flowcharts of various methods for operating the electrical system 100. FIG. 7 specifically illustrates a flowchart of a method 700 for operating the electrical system 100 so as to reduce EMI emissions.

One or more of the operational signals of the functional circuit are accessed (act 701). This act is optional as the embodiment of FIG. 6 does not require access to an operation signal 111 of the functional circuit 110. In the context of FIGS. 2 and 3, the input signal (which could be an operation signal of the functional circuit) is provided to inverter/buffer 211. In the context of FIGS. 4 and 5, the differential input signal 401 is provided to the common mode generation circuit 411. The antenna signal is then generated (act 702) using at least one operational signal of the functional circuit. For instance, in FIGS. 2, 4 and 6, the output signals 203, 404 and 631, respectively, are generated. The antenna signal is then applied to the antenna circuit (act 703).

FIG. 8 illustrates a flowchart of a method 800 for generating the antenna signal. The method 800 represents an example of the act 702 of FIG. 7. First, an input signal is optionally prepared (act 801) based on one or more operation signals of the functional circuit. The act 801 is optional in two senses. First, in the embodiment of FIG. 6, an operational signal is not used at all by the antenna signal generation circuit 600. Second, in the single-ended embodiment, the single-ended signal may be used directly as an input signal without any further preparation. In the context of the differential signal embodiment of FIG. 4, the common mode signal generation circuit 411 prepares the common mode signal.

Delay is introduced into the signal (act 802) and the signal is given an appropriate amplification (act 803). Referring to the discussion of Equation 5, this allows the antenna signal to be tailored to reduce EMI emissions under the dual antenna model. For instance, in FIG. 2, the adjustable delay control 221 and the adjustable amplitude control 222 are provided to the inverter/buffer 211. In FIG. 4, the adjustable delay control 421 is provided to the inverter/buffer 412, and the adjustable amplitude control 422 is provided to the common mode generation circuit 411 and/or the inverter/buffer 412. In FIG. 6, the delay/frequency control 640 adjusts the phase introduced by the frequency synthesis module 620. In addition, the amplitude of the signal may also be adjusted by the frequency synthesis module 620.

The signal is then optionally filtered (act 804). For instance, in FIGS. 2, 4 and 6, this function is performed by the filters 212, 413 and 630, respectively.

FIG. 9 illustrates a flowchart of a method 900 for calibrating the electrical system 100 so as to reduce electro-magnetic interference emitted by the electrical system. The electrical circuit is operated (act 901) and then calibrated while in operation (act 902). Specifically, one or more parameters of the antenna signal generation circuit are adjusted (act 911) while the effective result on EMI is measured (act 912). This is repeated until EMI is reduced in a desired way.

Accordingly, the principles described herein permit for the effective reduction of EMI using an antenna circuit that generates opposing EMI in the problematic frequencies. This is performed without significantly affecting signal quality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electrical system comprising:
    an antenna circuit for carrying an antenna signal that is not used for signal processing, but is configured to emit electromagnetic radiation that at least partially offsets electromagnetic interference emitted by an operational signal of a functional circuit; and
    an antenna signal generation circuit configured to be coupled in proximity to the functional circuit and coupled to the antenna circuit and configured to generate the antenna signal such that when the antenna signal is applied to the antenna circuit, the resultant emitted electromagnetic radiation at least partially offsets the electromagnetic interference emitted from the functional circuit.

2. The electrical system in accordance with claim 1, wherein the antenna signal generation circuit is configured to be coupled to the functional circuit and configured to use the operational signal in generating the antenna signal.

3. The electrical system in accordance with claim 2, further comprising the functional circuit coupled to the antenna signal generation circuit and proximate to the antenna circuit.

4. The electrical system in accordance with claim 3, wherein the functional circuit and the antenna circuit are on one semiconductor die.

5. The electrical system in accordance with claim 3, wherein the functional circuit and the antenna circuit are on different semiconductor die, but on a same board.

6. The electrical system in accordance with claim 2, wherein the operational signal is a single-ended operational signal.

7. The electrical system in accordance with claim 6, wherein the antenna signal generation circuit comprises:
a delay mechanism configured to receive the single-ended operational signal and configured to introduce a delay element into the single-ended operational signal to provide a delayed single ended operational signal.

8. The system in accordance with claim 7, wherein the antenna signal generation circuit further comprises:
a pass filter coupled to the delayed single-ended operation signal and configured to perform a frequency-based filter operation to thereby generate the antenna signal.

9. The electrical system in accordance with claim 7, wherein the delay element has adjustable delay.

10. The electrical system in accordance with claim 1, wherein the operational signal is a differential signal.

11. The electrical system in accordance with claim 10, wherein the antenna signal generation circuit comprises:
a common mode signal generation circuit configured to generate a common mode signal of the differential operation signal; and
a delay mechanism that receives the common mode signal and introduces a delay into the common mode signal.

12. The electrical system in accordance with claim 11, wherein the antenna signal generation circuit further comprises:
a pass filter coupled to the delayed common mode signal and configured to perform a frequency-based filter operation to thereby generate the antenna signal.

13. The electrical system in accordance with claim 1, wherein the antenna signal generation circuit includes a mechanism for adjusting an amplitude of the antenna signal.

14. A method for operating an electrical system comprising:
an act of accessing at least one operational signal of a functional circuit;
an act of generating an antenna signal using the at least one operational signal of the functional circuit, wherein the antenna signal is not used for signal processing, but is used to emit offsetting electromagnetic radiation when applied to the antenna circuit, the offsetting electromagnetic radiation at least partially cancelling electromagnetic radiation emitted by the at least one operation signal; and
an act of applying the antenna signal to the antenna circuit.

15. The method in accordance with claim 14, wherein the act of generating the antenna signal comprises:
an act of introducing delay into an input signal that is at least derived from an operational signal of the at least one operations signal of the functional circuit.

16. The method in accordance with claim 15, wherein the act of generating the antenna signal further comprises:
an act of filtering the delayed input signal.

17. The method in accordance with claim 16, wherein the filtered and delayed input signal is the antenna signal.

18. The method in accordance with claim 15, wherein the operational signal is a common-mode signal.

19. The method in accordance with claim 15, wherein the operational signal is a differential signal, the act of generating the antenna signal further comprising:
an act of generating a common mode signal of the differential signal, wherein the common mode signal is the input signal.

20. A method for calibrating an electrical circuit so as to reduce electro-magnetic interference emitted by the electrical circuit, the method comprising:
an act of operating the electrical circuit that includes a functional circuit and an antenna circuit, the antenna circuit being used to carry an antenna signal that is not used to perform signal processing in the functional circuit, but is used instead to emit offsetting electromagnetic radiation when applied to the antenna circuit, the offsetting electromagnetic radiation being used to at least partially cancel the electromagnetic interference emitted by at least one operational signal within the functional circuit, wherein the electrical circuit also includes an antenna signal generation circuit that generates the antenna signal using one or more operational signals of the at least one operational signal.

21. The method in accordance with claim 20, further comprising:
an act of providing a capability to calibrate the electrical circuit by adjusting one or more parameters of the antenna signal generation circuit and measuring the resulting electromagnetic interference emitted by the electrical circuit.

* * * * *